United States Patent [19]

Quittkat et al.

[11] 4,217,092
[45] Aug. 12, 1980

[54] METHOD AND DEVICE FOR SINTERING MATERIAL OF DIFFERENT GRANULAR SIZE

[75] Inventors: Wolfram Quittkat, Gauting; Dieter Frank, München-Obermenzing, both of Fed. Rep. of Germany

[73] Assignee: Babcock Krauss-Maffei Industrieanalgen GmbH, Mucich, Fed. Rep. of Germany

[21] Appl. No.: 956,140

[22] Filed: Oct. 30, 1978

[30] Foreign Application Priority Data

Oct. 29, 1977 [DE] Fed. Rep. of Germany ....... 2748670

[51] Int. Cl.³ .......................... F27B 15/00; F27B 7/02
[52] U.S. Cl. ...................................... 432/14; 432/58; 432/106
[58] Field of Search ................. 432/13, 14, 15, 58, 432/106

[56] References Cited

U.S. PATENT DOCUMENTS

| | | | |
|---|---|---|---|
| 3,832,128 | 8/1974 | Paul | 432/14 |
| 4,014,641 | 3/1977 | Shigeyoshi et al. | 432/106 |
| 4,025,296 | 5/1977 | Buchner | 432/106 |

FOREIGN PATENT DOCUMENTS 2123889 12/1971 Fed. Rep. of Germany .

Primary Examiner—John J. Camby
Attorney, Agent, or Firm—Allison C. Collard; Thomas M. Galgano

[57] ABSTRACT

A method and device for sintering materials and, in particular, limestone gravel, of very different granular size in the granular range of 5 to 50 mm, in a rotary shaft kiln with a shaft preheater and shaft cooler, are provided wherein the sintering charge of the original gravels are crushed into two or more granular fractions and are fed in a low band width to the furnace system periodically and alternately, and wherein the process gases flow through the filling or charge layers of the sintering materials. The filling layers are automatically changed in the shaft preheater and the shaft cooler in their thickness, so that the flow through resistance thereof remains constant.

10 Claims, 5 Drawing Figures

METHOD AND DEVICE FOR SINTERING MATERIAL OF DIFFERENT GRANULAR SIZE

The invention relates to a method and apparatus of sintering materials of very different granular size in the granular range of 5 to 50 mm and, in particular, limestone gravel in a rotary shaft-kiln with a shaft preheater and cooler.

It is known to use vertical shaft kilns or furnaces for making sintered lime when it is desired to use rather low amounts of fuel. However, in shaft kilns only relatively coarse, limited and classified granular material may be used. When finely granulated materials have to be used, a minimum degree of sintering and a minimum residue-$CO_2$ content is required, so that rotary shaft kilns or furnaces are used which have a substantially higher specific heat requirement. By combining the rotary shaft kilns with shaft preheaters and shaft coolers the specific heat requirement can be substantially lowered. Such systems are described in ZKG 2/69 (Plank) and 1/74 (Wiemer). However, a substantial disadvantage of these systems is that they can be used only for a limited size of granular material (largest granular size with respect to lowest granular size is 2:1) having a lowermost granular size of not below 15 mm (i.e., lower limit of 15 mm) because otherwise the flow through resistance becomes too high and the distribution of the hot gases in the charge becomes too uneven. Therefore, the utilization of granular limestone below 15 mm is a very serious economical problem for the limestone factories.

It is therefore an object of the invention to enlarge the utilization range of rotary shaft kilns with shaft preheaters and shaft coolers, so that a larger range of granular sizes may be used, and in particular, to expand the lower granular size range.

From the German Pat. No. 2 250 830, it is known to separate the charge material into a coarse and a fine fraction (by means of a sieve) and feed this separated material into the preheater. This is carried out by two separated concentric shafts having a partially parallel and successive gas flow. This results in a preheating without encountering a large flow resistance. However, one cannot expect a product having an even sintering degree and a low residue-$CO_2$ content with rotary kilns of this type, because both granular sizes reunite in the rotary kiln to form a wide granular band (grain band) which is subjected to an uneven heat effect in view of the so-called "kidney formation" which is typical in the final mixture of the charge material in such types of rotary furnaces. In particular, the fine material in the center of the "kidney" is not as strongly sintered and the median grain granular material has a substantially increased residue-$CO_2$-content. Furthermore, this wide granular band causes an uneven cooling with increased heat loss in the shaft cooler due to its high flow resistivity, and sintering difficulties due to the presence of a large amount of dust.

This problem is solved in accordance with the present invention by the provision of a method of sintering materials and, in particular, limestone gravel, of very different granular size in the granular range of 5 to 50 mm in a rotary shaft kiln having a shaft preheater and shaft cooler, wherein the sintering charge of the original gravel material is initially crushed into a plurality of granular fractions which are fed in a low band width to the furnace system periodically and alternately. The process gases flow through the filling layers of the sintering materials, and the filling layers are automatically changed in the shaft preheater and the shaft cooler in their thickness, so that the flow through resistance thereof remains constant.

The known disadvantages are overcome by this inventive method in that the charge of the original size granular materials are crushed into two or more granular fractions having a band width below 2:1 which are systematically and periodically alternatingly fed into the charge material of the furnace. It is a prerequisite according to the invention that the shaft preheater and the shaft cooler be adjusted in a simple manner and immediately to the different flow resistance of the fraction present in the furnace. This is achieved in that the charge material through which flow the hot and cool process gases and the exterior surface of which in both heat exchangers (i.e., the preheater and cooler) is defined by a free-forming slope, is rendered thicker or thinner by lifting or lowering a control gate, and that the flow resistance of the charge is held constant by means of an automatic control system which acts on the control gate. For example, the shaft preheater may be alternately administered with granular fractions of 8-16, 16-32, and 32-64 mm granular sizes, whereby the switch over from one granular size to another depends on the storage capacity which, in this case, takes place in periods of 8 hours.

A seemingly similar arrangement is described in German Pat. No. 2 123 889, which is provided with a stationary separating wall which extends from above into the sloping mound of charge material. This separating wall has the task to separate two slope sections of a different filling height, so that two partial air flows may be exhausted, whereby the partial flow quantity ratio may be controlled by throttling one of the flows. This should result in adjusting the gas through flow with respect to the different flow through capacity of the charge for the purpose of an even heating of the granular material. As an advantage, it is emphasized that the control of the gas quantity can be carried out independent from the gravel charge. It should be noted that the controllability is obtained by throttling, that is subject to loss, so that such an arrangement does not permit an adjustment to the flow resistance of the charge which differs by more than the factor 2.

Other objects and features of the present invention will become apparent from the following detailed description when taken in connection with the accompanying drawings which disclose one embodiment of the invention. It is to be understood that the drawings are designed for the purpose of illustration only, and are not intended as a definition of the limits and scope of the invention.

In the drawings, wherein similar reference characters denote similar elements throughout the several views.

Figure 1:
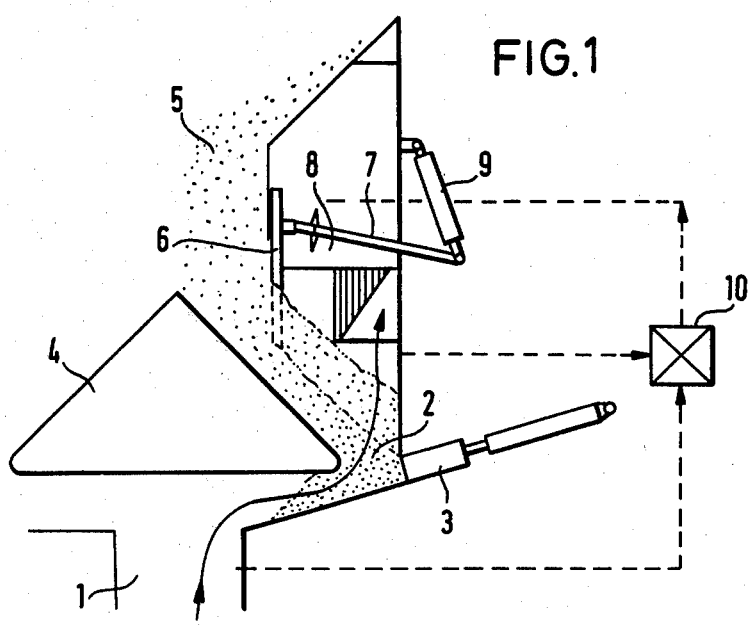
FIG. 1 is a partially-schematically illustrated side view of a shaft preheater used in the kiln assembly according to the present invention.
Figure 2:
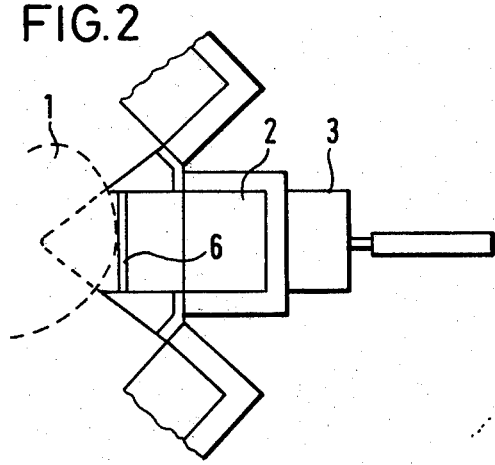
FIG. 2 is a plan view of an adjustment slide of the shaft preheater shown in FIG. 1.

Referring now in detail to the drawings and, in particular, FIGS. 1 and 2, the kiln assembly includes a shaft preheater which essentially consists of combustion chambers 2 each having a rectangular cross section and which are polygonally arranged around a connecting gas entry shaft 1. The first charge of sintering material is pushed downwardly to the combustion chambers by the oscillating movement of displacement plungers 3 and is simultaneously dosaged. In view of the fact that the displacement plungers 3 wipe along the total combustion chamber cross section, an adhering of the charge to parts of the shaft is prevented.

This results in an advantageous shaping of the preheating shafts. Hitherto, the plungers and their associated strokes were so short that they only transgressed a portion of the shaft cross section, so that closed circumferential annular shaft areas were formed between the plungers wherein the granular material did not move so smoothly; as a result, these areas became plugged up due to dust settling and then expanded into the still effective shaft cross section which therefore necessitated the cleaning of the shaft after a certain operating time. In contrast thereto, in the inventive arrangement of the shaft cross section and the plunger path no portion of the charge column can be so densely packed that it remains in a stationary hanging position because due to the periodic removal of the material from below in relatively short time intervals, the column always moves downwardly.

Figure 5:
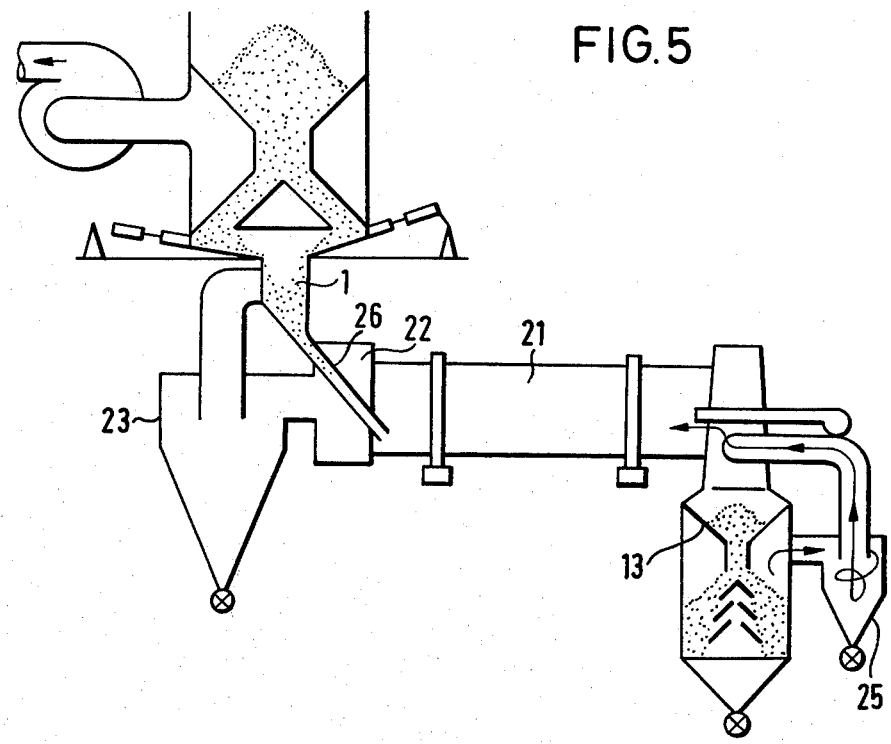
FIG. 5 is a schematically-illustrated side view of the entire kiln assembly.

Centrally above the connecting shaft 1, a blunt ended pyramid-like polygonal displacement element 4 is provided which evenly distributes the charge material which discharges from an upper central discharge shaft 5 into the peripheral combustion chambers 2, the charge material moving in a downwardly-sloping manner over element 4. Discharge shaft 5 is provided at its lower end with a layer height adjustment slide or gate 6 which can be moved upwardly and downwardly by means of a lever mechanism 7. Lever mechanism 7 is actuated by an adjustment device 9 which is located outside of the discharge gas chamber 8. The static pressure differential which is caused by the hot gas flowing through the charge layer is measured above and below the charge layer and is adjusted to a nominal value by means of a control 10 which activates adjustment device 9. Due to this mode of operation, different layer thicknesses with an even flow resistance are obtained depending on the granular size of the charge material so that the quantity of gas of the system may be maintained independent from the granular size of the charge. Since in fine granular sizes different through flow resistances may be caused due to demixing in the charge storage tank and the charge shaft 5, it is advantageous that each of the sintering material shafts be provided with its own layer height adjuster independent from the others. The flow resistance of the charge is increased, in particular, with fine granular material, when the dust which exists due to the stress of the charge material in the charge and the kiln dust which is flowing from the kiln with the discharge gases to are not pulled with the charge material through the preheating shaft. Therefore, it is advantageous to install a cyclone or cyclone collector 23 in the path of the discharge gases from the rotary charge head 22 to the gas entry shaft 1 of the shaft preheater, as is shown in FIG. 5, so as to separate this dust before the gases enter the preheater. Thereby, the funneling of the preheated charge material into the rotary furnace by maintaining a required differential pressure for the effective operation of the cyclone is anticipated by a rather tightly dimensioned charge material feeding pipe 26.

Figure 4:
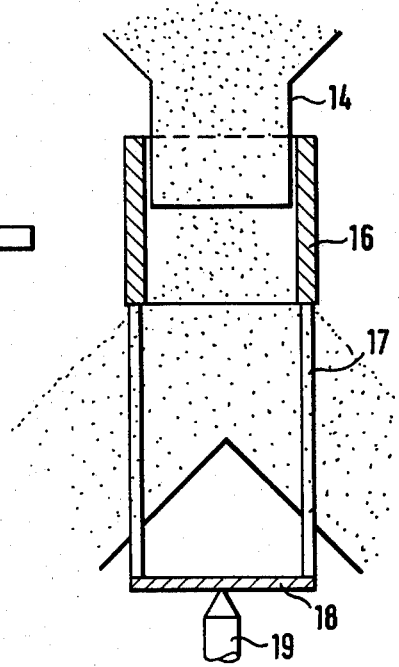
FIG. 4 is an enlarged view of a section of the shaft cooler shown in FIG. 3.
Figure 3:
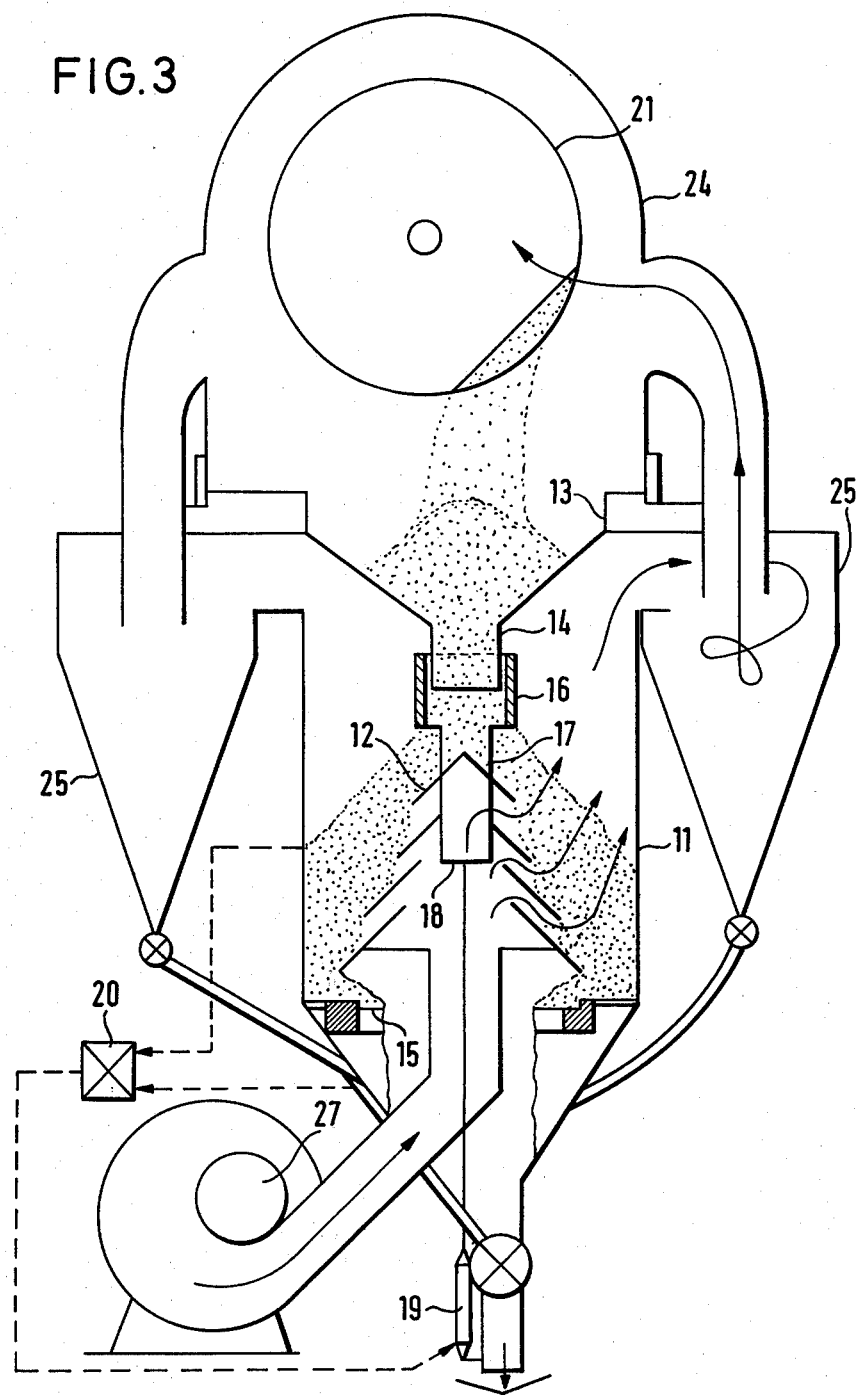
FIG. 3 is a partially-schematically illustrated side view of the kiln assembly shaft cooler.

As shown in FIGS. 3 and 4, the kiln assembly also includes a shaft cooler which consists of a cylindrical housing 11 in which a pine tree-like ventilation cone 12, and centrally thereabove, a collecting funnel 13 is provided. The cooling material which discharges from the discharge pipe 14 forms a slope about the ventilation cone 12 and fills the cylindrical space to the bottom beneath the ventilation cone 12 which is defined by a rotatable annular plate 15. The inner opening of plate 15 is spaced from the lower edge of the ventilation cone 12 to permit the cooling material to discharge therethrough. The discharge speed and the discharge quantity is dependent upon the rotating speed of annular plate 15.

In order to adjust the height of the charge material to the flow resistance of the charge, the lower portion of discharge pipe 14 of the collecting funnel 13 is telescopically received within a movable pipe member 16 which is axially guided by a linkage 17. Linkage 17 consists of three round rods which vertically penetrate air ventilation cone 12 from above and which are joined below to a cross head 18 (FIG. 4) which engages an adjustment device 19 in the air-cooled space of ventilation cone 12. Adjustment device 19 moves and maintains pipe member 16, which acts as an annular slide or gate, into a given higher or lower position relative to the lower portion of discharge pipe 14. A control device 20 actuates adjustment device 19 in the same manner as in the shaft preheater, whereby the pressure difference above and below the charge is transmitted as the measuring dimension, so that the control element maintains the flow resistance constant.

Experience has shown that it is very disturbing in the operation of such a furnace or kiln system when the sintering charge in the rotary furnace is subjected to a heavy wear and tear and that the dust created thereby is carried from the shaft cooler and back into the range of the flame with the secondary air. This problem is particularly disturbing when operating with fine sintering material.

A dedusting of the secondary air is not used hitherto in the coolers, because the differential pressure required for operating a cyclone is not available, because the heated cooling air is always directly fed into the furnace head and to the burner, so that the static pressure in the furnace head may deviate only a little bit from the outside air pressure, in order to prevent the blowing out of dust or the suctioning off of false air, respectively, through the furnace discharge seal.

In the shown embodiment the prerequisites for installing a cyclone are provided in that the normally present connecting shaft between the cooling zone and the kiln discharge head 24 are closed for the passing through of the cooling air, and that the sintering charge funnel 13 is connected at all sides with the cooling housing, thus acting as a charging valve and a centering for the charge material. Thereby, cyclones 25 (FIG. 3) can be easily switched into or incorporated into the secondary air flow.

Since the collector funnel prevents a circumvention of the cyclones by the hot air, provided it is sufficiently filled, and thus provides an effective seal, the cyclones may be operated with the excess pressure of the cooling air blower 27, i.e., no separate hot air blower is required. Thereby, the opertion of the cyclones at this point is made possible by the operation of the collector funnel which guides the sintering material, which discharges in demixed shape from the rotary furnace, to the center of the ventilation cone, in addition to the sealing and charging valve function thereof. In this way a uniform granular distribution to all sides is obtained and a non-uniform air permeability in the area of the charge material is prevented.

While only one embodiment of the present invention has been shown and described, it will be obvious to those persons of ordinary skill in the art, that many changes and modifications may be made thereunto, without departing from the spirit and scope of the invention.

What is claimed is:

1. A method of sintering materials of very different granular size in the granular range of 5 to 50 mm, which is divided into different granular fractions having a low band width, in a rotary shaft kiln having a shaft preheater and a shaft cooler through which the material is fed in charge layers, comprising the steps of:
    feeding said fractions in an alternating and consecutive manner into the kiln;
    directing the flow of kiln gases through the entire material of the charge layers of the sintering material; and
    maintaining the flow-through resistance of said charge layers constant by automatically adjusting the thickness of the charge layers in the shaft preheater and the shaft cooler.

2. The method according to claim 1, wherein carbonaceous charge material is used.

3. A shaft preheater for a rotary shaft kiln comprising:
    a first housing segment defining a gas entry shaft;
    a second housing segment defining a gas discharge shaft;
    a third housing segment defining a charge discharge shaft disposed above said first housing segment defining said gas entry shaft;
    a blunt-ended pyramidal-like polygonal displacement element disposed between said first and second housing segments and in axial alignment with said gas entry shaft and said charge discharge shaft;
    a fourth housing segment at least partially defining a plurality of combustion chambers arranged in a polygonal fashion about said gas entry shaft defined by said first housing segment in an area adjacent to said displacement element, said combustion chambers each having an oscillating displacement plunger associated therewith for forcing the charge material into said chamber with which it is associated;
    a fifth housing segment defining a gas discharge chamber which is located generally above said combustion chambers and concentrically disposed relative to said discharge shaft;
    a plurality of vertically-displaceable layer adjustment gates disposed adjacent to the lower end of said charge discharge shaft, each of which is associated with one of said combustion chambers for adjusting the height of the layer of charge material fed from said discharge shaft to said associated combustion chamber;
    a plurality of lever mechanisms, each of which is associated with and coupled to one of said gates for displacing said associated gates; and
    a plurality of adjustment devices each of which is associated with and coupled to one of said lever mechanisms and which is located outside of said gas discharge chamber for actuating said associated lever mechanism.

4. The shaft preheater according to claim 3, additionally including a plurality of control means for controlling each of said adjustment devices, said control means including means for comparing the static differential pressure beneath and above the layer of charge material with a given nominal value so as to control the adjustment device and, in turn, the layer height of the layer of charge material.

5. The shaft preheater according to claim 3, wherein said combustion chambers have a rectangular cross section and wherein said displacement plungers have a complementary dimensional rectangular cross section so that said combustion chambers are completely wiped by said displacement plungers.

6. A shaft cooler for a rotary shaft kiln, comprising:
    a generally cylindrical housing;
    a pine-tree like ventilation cone disposed in the lower portion of said housing, said cone comprising a plurality of downwardly-sloping vertically spaced-apart and overlapping generally cone-shaped baffle plates;
    a kiln discharge collecting funnel mounted above and concentrically disposed relative to said ventilation cone, said funnel having a discharge pipe;
    a rotatable annular plate mounted beneath said ventilation cone which serves as a metering device for discharging the charge material dispensed from said collecting funnel and received on said ventilation cone;
    a vertically movable annular gate telescopically disposed relative to said discharge pipe of said collecting funnel;
    a linkage assembly coupled to said gate to axially guide the movement thereof, said linkage assembly extending through said ventilation cone; and
    an adjustment device disposed inside said cone which is coupled to said linkage for adjusting the vertical position of said gate.

7. The shaft cooler according to claim 6, additionally including means for comparing the measured differential pressure below and above the charge layer with a given nominal value and for controlling the adjustment device in response to said deviations from said nominal value.

8. The shaft cooler according to claim 6, wherein said collecting funnel is directly connected about its total circumference with said housing so as to provide in the filled condition thereof, a seal for the hot cooling air which is blown through the cooling bed of charge material disposed on said ventilation cone, said funnel also acting as a material charging inlet which dispenses the charge material into said cone due to gravity and effects subsequent moving of the material into said housing due to the increased pressure.

9. A kiln assembly comprising a rotary shaft kiln having an inlet and to which is coupled a shaft preheater having a housing defining a gas entry shaft and an outlet end to which is coupled a shaft cooler, said kiln having a rotary kiln charging head coupled to said gas entry shaft via a gas discharge line, and at least one cyclone incorporated into said discharge line for collecting dust.

10. A kiln assembly comprising a rotary shaft kiln having an inlet end to which is coupled a shaft preheater and an outlet end to which is coupled a shaft cooler having a housing in which is defined a kiln discharge collecting funnel and a ventilation chamber disposed beneath said funnel, said kiln also having a rotary shaft kiln discharge head disposed above said funnel and connected via a heated cooling air line to said ventilation chamber and at least one cyclone collector incorporated into said air line for collecting dust.

* * * * *